United States Patent [19]

Hammerslag et al.

[11] Patent Number: 4,629,947
[45] Date of Patent: Dec. 16, 1986

[54] ELECTRIC VEHICLE DRIVE SYSTEM

[76] Inventors: Julius G. Hammerslag, 27011 Calle Esperanza, San Juan Capistrano, Calif. 92678; Gary R. Hammerslag, 6202 W. Oceanfront, Newport Beach, Calif. 92663

[21] Appl. No.: 719,605

[22] Filed: Apr. 3, 1985

[51] Int. Cl.$^4$ .............................................. H02K 7/02
[52] U.S. Cl. ................................... 318/161; 318/150; 310/74; 74/572
[58] Field of Search ....................... 318/150, 161, 648; 310/74, 153; 322/4; 180/65.2, 165; 74/5.22, 572

[56] References Cited

U.S. PATENT DOCUMENTS

| | | | |
|---|---|---|---|
| 4,077,678 | 3/1978 | Studer et al. | 310/153 X |
| 4,218,624 | 8/1980 | Schiavone | 322/4 X |
| 4,309,620 | 1/1982 | Bock | 180/65.2 X |
| 4,423,794 | 1/1984 | Beck | 180/65.2 X |
| 4,495,451 | 1/1985 | Barnard | 318/150 |

FOREIGN PATENT DOCUMENTS

| | | | |
|---|---|---|---|
| 55-36641 | 3/1980 | Japan | 74/572 |
| 0437906 | 7/1975 | U.S.S.R. | 74/572 |

OTHER PUBLICATIONS

Lustenader et al., "Flywheel Module for Electric Vehicle", Proceedings of the 12th Intersociety Energy Conversion Engineering Conference, Washington, D.C., pp. 269-274, 28 Aug.-2 Sep. 1977.

Primary Examiner—William M. Shoop, Jr.
Assistant Examiner—Bentsu Ro
Attorney, Agent, or Firm—Newton H. Lee, Jr.

[57] ABSTRACT

An electric vehicle power system has a battery system to drive an electric drive motor. A flywheel is provided to supply energy to drive a generator for supplying electric current during peak loads on the battery-motor system and minimize current drain on the battery caused by acceleration of the vehicle. A microprocessor controls the system to apply needed current to the vehicle drive motor or motors. The flywheel is mounted in a vacuum housing which allows angular motion of the vehicle relative to the flywheel to avoid gyroscopic effects of the flywheel on the vehicle. A flywheel is mounted on a horizontal axis in a housing pivotal on a vertical axis, or the flywheel is mounted on a vertical axis in a housing pivotal on a horizontal axis. In one form, the flywheel is the rotor of the motor-generator.

3 Claims, 3 Drawing Figures

ELECTRIC VEHICLE DRIVE SYSTEM

BACKGROUND OF THE INVENTION

In the operation of battery powered automobiles or vehicles, range, acceleration and speed have been limited by the ability of the battery to supply the necessary current over prolonged periods of time without requiring recharge.

Moreover, high current drain on the battery during acceleration from a stopped condition or to higher speeds under highway conditions are detrimental to the longevity of the battery.

The typical electric battery functions best and has greatest useful life when energy is discharged or stored at constant, relative low current levels, as is well known.

In POPULAR SCIENCE, October 1980, page 82, et seq., there is disclosed a battery powered, gear driven electric car in which a flywheel is used to power the car from stopped conditions, and the flywheel is energized during braking of the car. The purpose is to reduce battery abuse caused by the typical driving cycle in normal urban use, that is, start, accelerate, stop, and restart. However, that electric car utilizes a mechanical transmission of power from the flywheel and the drive motors to the vehicle drive wheels, inherently utilizing, or wasting energy.

Gyroscopic effects of a rapidly rotating flywheel on a horizontal axis normal to the longitudinal center of the car must be overcome.

SUMMARY OF THE INVENTION

The present invention utilizes a flywheel in an electric vehicle battery system in a novel and improved manner.

More particularly, the present invention incorporates the flywheel in a battery system for an electric vehicle in such a manner that all mechanical drive and resultant friction is eliminated.

In addition, the flywheel is incorporated in the system in such a manner that certain gyroscopic effects of the flywheel are minimized, by mounting the flywheel assembly on an axis which allows angular movement of the vehicle relative to the flywheel axis, either horizontally or vertically, as required.

Generally speaking, the system is one wherein (a) the flywheel constitutes one rechargeable energy source which is discharged or slowed down as energy is dissipated during vehicle acceleration and recharged or sped up when the vehicle is decelerating, and (b) the battery constitutes another rechargeable energy source which is discharged during vehicle use, but can be recharged or replaced when the vehicle is idle, which can be recharged during deceleration.

The invention contemplates the use of a microprocessor-controller in circuit with the vehicle drive motor means, a battery or battery pack, a motor-generator associated with or incorporated in the flywheel, an accelerator foot pedal and a brake foot pedal, whereby the discharging and charging of the two energy sources is controlled by the microprocessor according to operating conditions determined by accelerating, braking or vehicle power requirements, whereby current drain on the battery can be maintained substantially constant over the range of operating conditions from start to stop. The flywheel drives a generator which supplies current to the vehicle drive motor, under control of the microprocessor, when current demand is high.

In one illustrative form, the motor-generator is driven by the flywheel when energy demands exceed a desired current drain on the battery, and drives the flywheel when needed and the battery discharge requirements are low or negative during braking. In another form, the motor-generator includes a rotor which is the flywheel.

In the preferred form, the flywheel assembly includes a housing which can be evacuated to reduce friction during high speed revolution of the flywheel and so that during an idle period the flywheel will continue to revolve for a long period, so as to be available as an energy source when the vehicle is again used.

Also in the preferred form, the flywheel is mounted for rotation on a vertical axis in a housing which is pivoted on a horizontal axis transverse of the vehicle, thereby eliminating problems attendant to the gyroscopic action of the flywheel during turning. If desired, the housing may be gimbaled to further eliminate gyroscopic effects caused by changes in vehicle angular disposition in both longitudinal and transverse directions.

In the preferred form, the horizontal disposition of the flywheel enables the use of a relatively large diameter flywheel, without requiring substantial vertical height. Thus, the flywheel system may be incorporated in normal rear trunk space, while the battery, or battery pack, may occupy space beneath the passenger compartment or in the forward, hooded section, for ease of access for battery change, say in accordance with the prior pending applications Ser. No. 134,648, filed Mar. 27, 1980, now U.S. Pat. No. 4,334,819.

This invention has other advantages and features which will best be understood by reference to the examples disclosed herein, but it is to be understood that the following detailed description and the accompanying drawings are not to be taken in a limiting sense.

DESCRIPTION OF THE PREFERRED EMBODIMENTS

Figure 1:
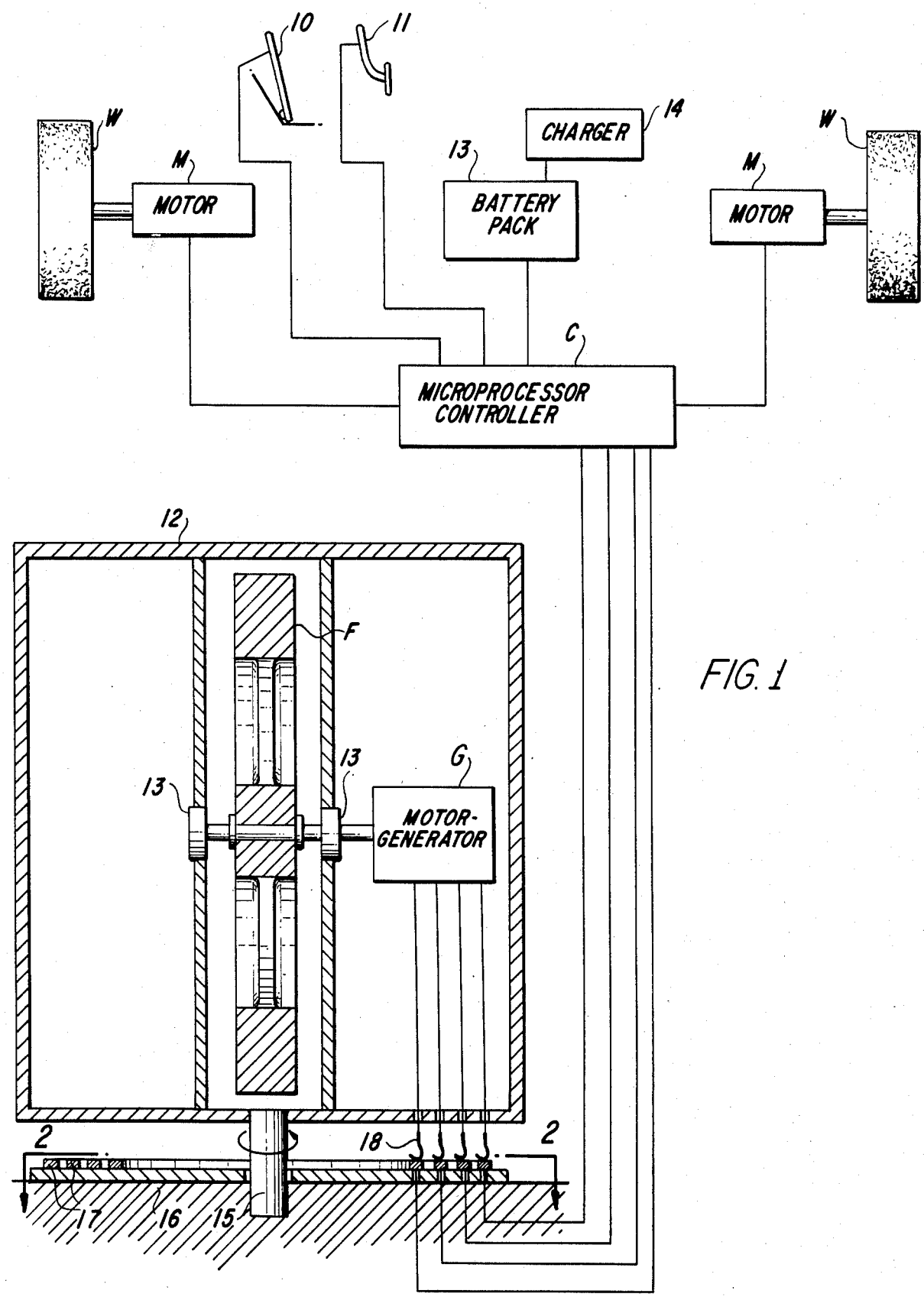
FIG. 1 is a diagrammatic view showing one embodiment of the invention.

As seen in the drawings, in a diagrammatic form, vehicle wheels W are adapted to driven and braked by drive motor-brake means M, under the control of a microprocessor controller C, through which current is supplied from a first rechargeable battery or battery pack B and a second rechargeable source comprising a flywheel F and a motor-generator G. Current is supplied to or derived from the motor-brake means M, during driving or deceleration, also under the control of controller C, which is also connected electrically with an accelerator pedal 10 and a brake pedal 11 in the vehicle.

The flywheel F is disposed in a sealed housing 12 adapted to be evacuated to reduce friction and enable high speed revolution without substantial energy loss. The flywheel is journaled in suitable bearings 13, which should be selected to permit high speed rotation with low friction. In an ultimate form, the flywheel may be adapted to essentially float on magnetic bearings to minimize friction.

In each form, the motor generator G is adapted, under control of the controller C, to establish high speed rotation of the flywheel which will be revolving prior to use of the vehicle. As examples, when the vehicle is idle in a garage, a battery charger 14, connected to house current in the usual manner, is employed to charge the batter B. When the battery is fully charged, the microprocessor C causes current to flow to the motor generator G to cause high speed rotation of the flywheel F. Thus, when the charger is disconnected from the house current, the flywheel is in high speed rotation, ready for use of the vehicle.

Microprocessor C is responsive to accelerator 10 to provide current from the battery B to motors M, which obviously are reversible under the control of a reversing switch, not shown.

As the vehicle accelerates, causing greater current drain on the battery, the microprocessor is adapted to sense a predetermined limit on current to the motors, say 60 amps, and limit the current supplied by the battery. The generator G, under control of the microprocessor, and driven by the flywheel is then adapted to supply added current to the motors for added acceleration. This prevents peaking of the load on the battery above a predetermined level, enabling longer periods of battery operation and preventing deleterious effects on the battery.

During cruising, when the load on the battery is less than the predetermined maximum determined by the microprocessor, and it is necessary to increase the speed of the flywheel, the battery current is directed to the motor generator G, as well as to the drive motors M, but with a limit on the maximum current drain, to increase the speed of the flywheel, in preparedness for the next requirement for increased current to drive motors M, in excess of the upper limit of battery power established by the microprocessor.

During braking, drive motors M, under control of brake pedal 11, or during downhill drifting, function as generators and absorb energy from the vehicle, applying a motive current through the microprocessor to motor generator G, to accelerate the speed of the flywheel. Such generating of current by the motors M can also supply a charging current to the battery.

The details of the microprocessor-controller need not be disclosed herein in detail, since the control functions described above can be accomplished by one of skill in the art, in the light of the above description.

Figure 2:
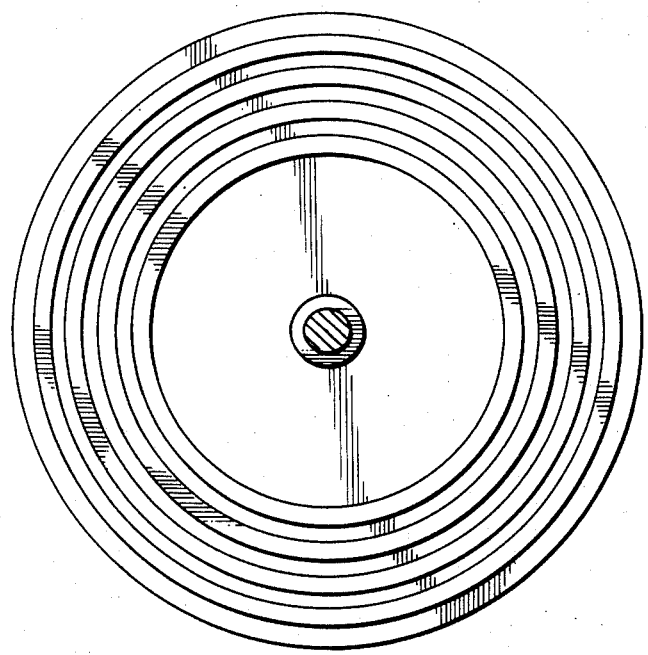
FIG. 2 is a transverse section on the line 2—2 of FIG. 1.

As seen in FIGS. 1 and 2, the flywheel assembly, including the housing 12 is mounted on a vertical shaft 15, in a suitable base 16, for pivotal movement about a vertical axis. Electrical connection between the motor-generator G and the microprocessor C is established by a suitable number of annular contacts 17 and brush contacts 18 on the base and housing. Thus, the vehicle which carries the base 16 can turn, without experiencing the gyroscopic effects of the high speed flywheel.

Figure 3:
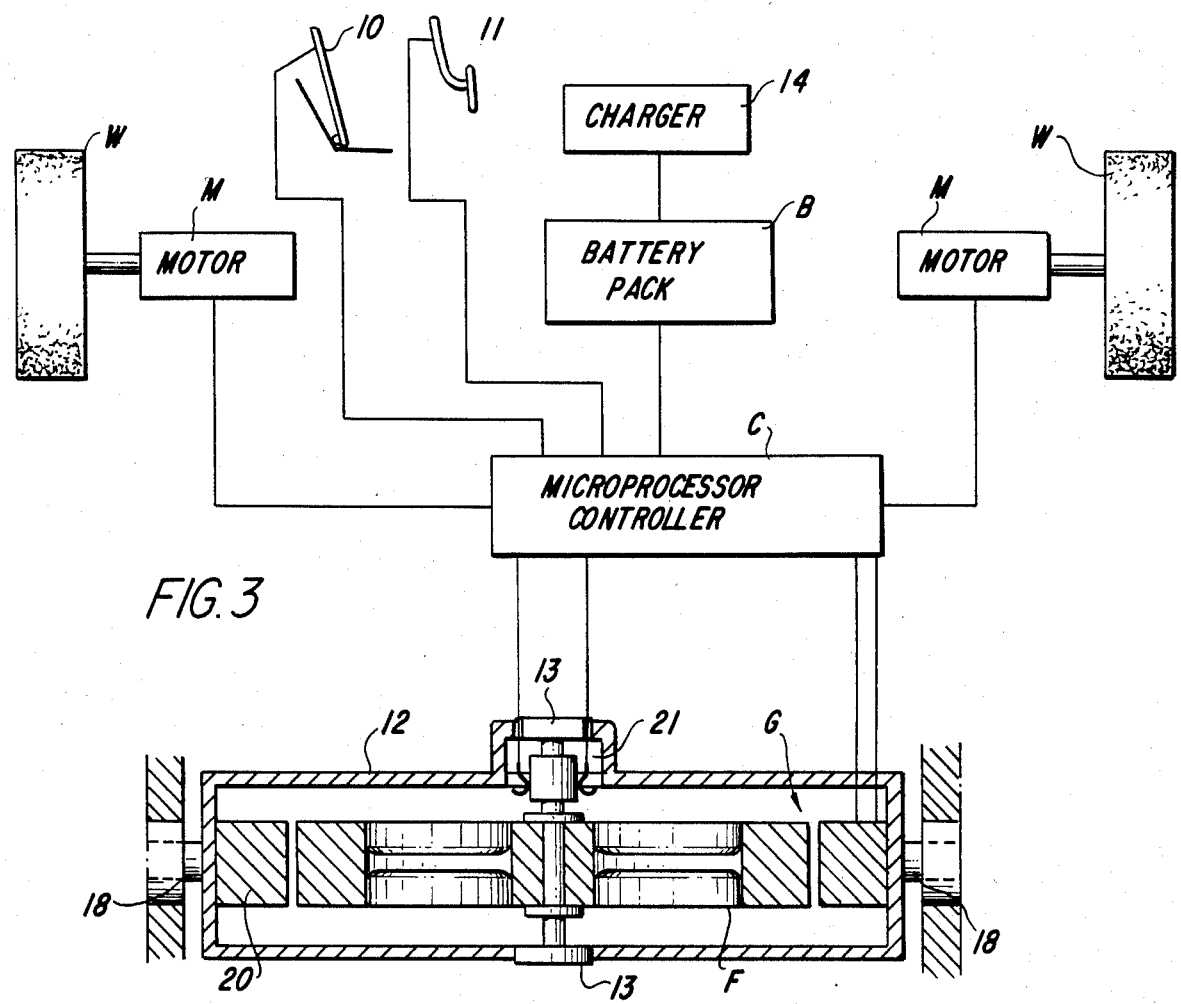
FIG. 3 is a diagrammatic view showing another embodiment of the invention.

As seen in FIG. 3, the flywheel housing is disposed horizontally, with trunnions 18 mounting the housing for angular or pivotal movement on a horizontal axis, transverse to the direction of vehicle travel. This not only eliminates gyroscopic effects when the vehicle turns, but also the vehicle is enabled to change angle from the horizontal, in the direction of vehicle travel, without experiencing gyroscopic effects of the flywheel.

While, in general, the flywheel-motor-generator arrangement of FIG. 3 may be as shown in FIG. 1, i.e., the motor generator may be a separate unit, driven by the or driving the flywheel, I prefer to construct the motor-generator, as seen in FIG. 3, wherein the rotor of the motor constitutes the flywheel.

More particularly, in FIG. 3, the housing 12 is horizontally broad, but relatively vertically flat, so as to be easily housed in the vehicle. The stator 20 of the motor-generator is fixed within the periphery of the housing, while bearings 13 support the flywheel-rotor for rotation on a vertical axis, with the commutator 21 also enclosed in the housing. Again the housing is adapted to be evacuated in a suitable fashion, whereby the flywheel can rotate at high speed with minimum resistance from air.

In order to enable the flywheel to rotate freely when the vehicle is idle, it may be desirable to demagnetize the field when the vehicle is parked, so that upon resumption of use, the flywheel is spinning, thereby avoiding the need for initiating flywheel rotation before resumption of use of the vehicle.

From the foregoing, it will be apparent that the present invention involves a unique combination of a pair of stored electrical energy sources, controlled through a microprocessor means to prevent over drain on the first source during high load periods. The vehicle is operable for longer periods of time wihtout battery recharge, and without heavy and costly gearing.

We claim:

1. An electric vehicle drive system, comprising: a vehicle drive wheel, a reversible electric motor-brake connected with said wheel, a battery source of stored electrical energy in circuit with said motor, controller means in said circuit, a motor-generator in circuit with said controller means, a flywheel connected in drive relation with said controller means, accelerator and brake means in circuit with said controller means, said controller means being operable to control current flow between said battery source and said motor generator and said motor-brake to limit the current supplied to said motor-brake from said battery source in response to the current demand to drive said drive wheel and to supply current from said motor-generator to said drive wheel, and mounting means supporting said flywheel for angular movement on an axis transverse to the axis of rotation of said flywheel, said mounting means supporting said flywheel on a horizontal axis and being angularly moveable on a vertical axis.

2. An electric vehicle drive system as defined in claim 1, said mounting means being in the form of a closed, evacuated housing.

3. An electric vehicle drive system as defined in claim 1, wherein said flywheel constitutes the rotor of said motor-generator.

* * * * *